Jan. 10, 1967  J. P. FRANCIS  3,297,356
AUTOMOBILE WINDSHIELD RAIN VISOR
Filed May 6, 1966
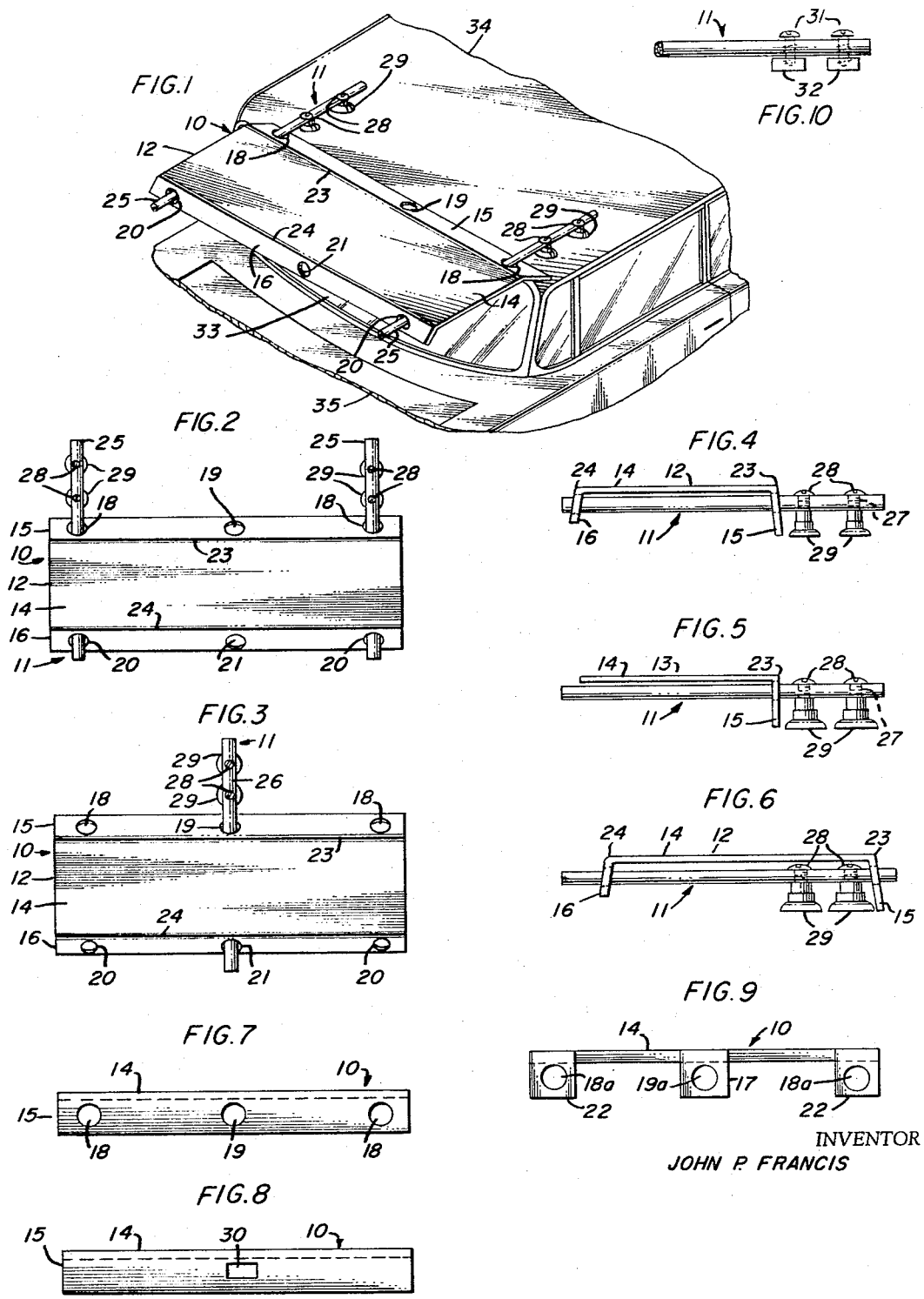
INVENTOR
JOHN P. FRANCIS United States Patent Office 3,297,356
Patented Jan. 10, 1967

3,297,356
AUTOMOBILE WINDSHIELD RAIN VISOR
John P. Francis, 20 Boston St., Haverhill, Mass. 01830
Filed May 6, 1966, Ser. No. 548,319
6 Claims. (Cl. 296—95)

This is a continuation-in-part of application Serial No. 471,764 filed July 13, 1965. Rain shield supports and rain shield structures are shown and described in my copending application. My invention therefore, is concerned primarily with improved and modified embodiments of a rain visor structure and the support thereof.

This invention relates to automobile windshield rain visors or weather protectors, and more particularly to a removably attached weather protector adapted for use in the protection of the windshield area, or other glass or transparent areas of the vehicle from rain, sleet, snow or ice when the vehicle is parked in a drive-in theatre, or any other type of an outdoor parking area.

A main object of the invention is to provide a novel, very simple, and improved weather protector which may be made of expendable and inexpensive material so that it may be discarded after one or more uses during inclement weather conditions. My most inexpensive form of a rain visor panel is made of material such as water proof cardboard, or any other form of a fibre board which may be coated or treated so as to be water proof for a limited period of time.

A further object of the invention is to provide a rain visor panel structure having laterally disposed vertical extensions, the vertical extensions being adapted to freely and slidably engage the longitudinally disposed visor supports for slidably movable adjustment and attachment, and for the removal of the visor panel in a like manner, to and from said visor supports.

With these objects and still others in view, as will hereinafter more fully appear, the invention comprises certain novel constructions, combination and arrangement of parts, hereinafter described and claimed and illustrated in the accompanying drawings, in which:

FIGURE 1 is a perspective view, in fragment, of the front portion of an automobile, the view including a perspective view of the rain visor and the supporting means for supporting the visor structure over the roof top and the windshield area.

FIGURE 2 is a top plan view of FIGURE 1, showing the rain visor structure and the supporting means therefor.

FIGURE 3 is a top plan view of a modified form of supporting means, showing a single centrally disposed visor support freely attached to the visor structure.

FIGURE 4 is a side elevation view of FIGURE 2, with the rain visor structure shown freely supported to the longitudinally disposed visor support.

FIGURE 5 is a side elevation view of a modified form of a rain visor structure, provided with only a rear laterally disposed vertical supporting extension.

FIGURE 6 is a side elevation view, showing a rain visor structure supported in an extreme rearward position on the longitudinally disposed visor support.

FIGURE 7 is a rear elevation view of the rear laterally disposed vertical supporting extension.

FIGURE 8 is a rear elevation view of a modified form of a rear laterally disposed vertical supporting extension, shown provided with a centrally located rectangular-shaped aperture.

FIGURE 9 is a rear elevation view of a modified form of rear laterally disposed and spaced apart vertical supporting extensions; and FIGURE 10 is a side elevation view, in cutaway, showing a longitudinally disposed visor support supported by magnetized roof engaging supporting means.

Referring now more particularly to the drawings, attention is directed primarily to FIGURES 1, 2, 3 and 5, wherein numeral 10 generally indicates the rain visor panel structure, shown also specifically as rain visor panel 12 and 13. Numeral 11 generally indicates the longitudinally disposed visor supports, shown also specifically as visor supports 25 and 26.

In FIGURE 1, a portion of an automobile is shown by numeral 35, with the visor panel 12 made of semirigid or rigid material, and which may be also formed of a flexible or fabric material, the visor panel being supported by the laterally spaced apart longitudinally disposed visor panel supports 25.

The longitudinally disposed visor supports 11, shown specifically as tubular supporting members 25 and 26, are supported by the roof engaging means comprising the vacuum cups 29, and are attached to the vertically disposed threaded bolt or screw members 28 extending through the apertures 27 of the visor supports 11. The visor supports 11 may be formed of metal, plastic, or water proof cardboard material, and may be of a structural shape other than tubular.

In FIGURE 10, modified roof engaging means are shown in the form of longitudinally spaced apart magnetized supporting members 32 each member 32 being engaged to a threaded bolt or screw member 31 extending through the visor support 11, and supporting the said support 11 above the roof top of a motor vehicle.

In FIGURES 1 and 2, there is shown a visor panel 12 formed with a rear laterally disposed vertical supporting extension or flap 15 provided with laterally spaced apart apertures 18, and a centrally located aperture 19. Also shown, is a forward laterally disposed vertical supporting extension or flap 16 provided with laterally spaced apart apertures 20, and a centrally located aperture 21.

In FIGURES 1, 2 and 3, the upper surface 14 of visor panel 12 may be provided with a rear lateral score line at 23 and a forward lateral score line 24 to permit the vertical supporting extensions 15 and 16 to be formed and bent to the desired downward angle. In a visor panel structure 10, the vertical supporting extensions 15 and 16 may also be preshaped at 23 and 24, in the use of rigid material such as plastic, Masonite, sheet metal or other such materials.

Referring back to FIGURE 1, the visor panel 12 is shown supported over the roof top 34 and the windshield area 33 of an automobile 35. The visor panel 12 is adapted to be freely and slidably attached on the longitudinally disposed visor supports 25 upon the engagement of the laterally spaced apart apertures 18 and 20 of the laterally disposed vertical supporting extensions 15 and 16, respectively. The rain visor panel 12, through the rear laterally disposed vertical extension 15, is engaged in frictional supporting and rain sealing engagement with the lateral contour of the roof top 34. In addition, lateral rigidity is provided at the rear lateral portion of the visor panel, more so, when a light cardboard or similar light or thin material is used.

In FIGURE 3, a single central visor support 26 is shown freely engaged to the central apertures 19 and 21 of the laterally disposed vertical supporting extensions 15 and 16, respectively.

FIGURE 4 is a side elevation view of FIGURE 2 showing the visor panel 12, with the laterally disposed rear and forward vertical supporting extensions 15 and 16 supportably engaged to the visor support 11.

In FIGURE 6, the visor panel 12 is shown supported in a rearmost longitudinal position on the visor support 11. For removal of the visor panel 12, the panel 12 is moved rearwardly to permit rear vertical extension 15 to be freely disengaged from the visor support 11, and then moved forwardly to disengage the forward vertical extension 16 from the said visor support 11.

A modified visor panel 13, shown in FIGURE 5, is provided with only a rear laterally disposed vertical supporting extension 15 adapted to freely and slidably engage the visor support 11.

In FIGURE 7, there is shown a rear laterally disposed vertical supporting extension or flap 15 extending downwardly from the visor panel 10. The said vertical extension 15 is shown provided with the visor support engaging apertures 18 and 19.

A modified laterally disposed vertical supporting extension or flap 15, FIGURE 8, is shown with a centrally located rectangular-shaped aperture 30, which is adapted to engage a visor support of similar structure or shape.

In FIGURE 9, a modified form of laterally spaced apart vertical supporting extensions or tabs 17 and 22 are shown, provided with the apertures 18a and 19a adapted to supportably engage one or more visor supports therethrough.

Referring back once more to FIGURE 1, it is quite apparent that the visor panel structure 10 is devoid of any securing means to secure the visor panel structure 10. The longitudinally movable visor panel 10 may be firmly held in the desired longitudinal position on the visor supports 11 by various ways. One is in the form of snug or reduced size apertures 18, 18a, 19, 19a, 20 or 21. Another is in the forced frictional engagement with the roof top, of the laterally disposed vertical supporting extensions 15, 16, 17 or 22. It is to be noted that the visor panel structure 10 may be mounted in reverse, on the visor supports 11, that is, the forward laterally disposed vertical supporting extension 16 could be the rear. Still another way to secure the visor panel structure 10 involves increasing or decreasing the lateral spacing of the visor supports 25, thus forcibly binding said engaged supports 25 in the apertures 18 and 20.

It is to be noted that my invention includes both a preformed visor panel structure, and a substantially flat cardboard or paper-like sheet provided with one or more bendable extensions. Furthermore, the visor panel structure is longitudinally movable and adjustably supported upon one or more longitudinally disposed visor supports. Also, any number of apertures 18 and 20 may be formed in the vertical supporting extensions 15 and 16.

It can readily be seen that the visor structure is adapted to provide rain sealing engagement with the lateral contour of the roof top, while the visor panel is supported in spaced apart relationship relative to the roof top. The visor structure is also provided with additional lateral rigidity with the forward and rear laterally disposed vertical supporting extensions, more so, in the use of any extremely light or thin material for the visor panel.

While certain embodiments of my invention have been disclosed in the foregoing description, it will be understood that various modifications may occur to those skilled in the art. Changes, therefore, in the construction and arrangement, may be made without departing from the spirit and the scope of the invention as disclosed in the appended claims.

I claim:

1. A weather visor structure for the windshield of a motor vehicle secured to the roof top thereof comprising a removably attached rain visor panel, a longitudinally disposed visor support, said removably attached rain visor panel being attachable and longitudinally adjustable upon sliding movement of said rain visor panel on said visor support, said rain visor panel having a laterally disposed vertical supporting extension extending at a downward angle from the rear lateral edge of said rain visor panel and provided with an aperture through said vertical supporting extension, roof engaging means mounted on the roof top and engaging the rear portion of said support in supporting said support therefrom and over the roof top and the windshield area, said visor support freely engaging the said aperture of said vertical supporting extension of said rain visor panel in adjustably supporting said rain visor panel for removable attachment thereto, the lower portion of said laterally disposed vertical supporting extension adapted to frictionally engage the lateral contour of the roof top.

2. A weather visor structure for the windshield of a motor vehicle secured to the roof top thereof comprising a removably attached rain visor panel, longitudinally disposed laterally spaced apart visor supports, said removably attached rain visor panel being attachable and longitudinally adjustable upon sliding movement of said rain visor panel on said visor supports, said rain visor panel having a laterally disposed vertical supporting extension extending at a downward angle from the lateral edge of said rain visor panel and provided with laterally spaced apart apertures through said vertical supporting extension, roof engaging means mounted on the roof top and engaging the rear portions of said supports in supporting said supports therefrom and over the roof top and the windshield area, said visor supports freely engaging the said spaced apart apertures of said vertical supporting extension of said rain visor panel in adjustably supporting said rain visor panel for removable attachment thereto, the lower portion of said laterally disposed vertical supporting extension adapted to freely engage the lateral contour of the roof top in providing rain sealing engagement therewith upon the adjustable rearward sliding movement of said rain visor panel.

3. A weather visor structure for the windshield of a motor vehicle secured to the roof top thereof comprising a removably attached rain visor panel, a longitudinally disposed visor support, said removably attached rain visor panel being attachable and longitudinally adjustable upon sliding movement of said rain visor panel on said visor support, said rain visor panel having a forward laterally disposed vertical supporting extension and a rear laterally disposed vertical supporting extension, each of said supporting extensions extending at a downward angle from the respective forward and rear lateral edges of said rain visor panel and provided with an aperture through each of said supporting extensions, roof engaging means mounted on the roof top and engaging the rear portion of said support in supporting said support therefrom and over the roof top and the windshield area, said visor support freely engaging the said apertures of the said forward and the said rear vertical supporting extensions of said rain visor panel in adjustably supporting said rain visor panel for removable attachment thereto, the lower portion of said rear laterally disposed vertical supporting extension adapted to frictionally engage the lateral contour of the roof top.

4. A weather visor structure for the windshield of a motor vehicle secured to the roof top thereof comprising a removably attached rain visor panel, longitudinally disposed laterally spaced apart visor supports, said removably attached rain visor panel being attachable and longitudinally adjustable upon sliding movement of said rain visor panel on said visor supports, said rain visor panel having a forward laterally disposed vertical supporting extension and a rear laterally disposed vertical supporting extension, each of said supporting extensions extending at a downward angle from the respective forward and rear lateral edges of said rain visor panel and provided with laterally spaced apart apertures through each of said supporting extensions, roof engaging means mounted on the roof top and engaging the rear portions of said supports in supporting said supports therefrom and over the roof top and the windshield area, said visor supports freely engaging the said apertures of the said forward and the said rear vertical supporting extensions of said rain visor panel in adjustably supporting said rain visor panel for for removable attachment thereto, the lower portion of said rear laterally disposed vertical supporting extension adapted to freely engage the lateral contour of the roof top in providing rain sealing engagement therewith upon the adjustable rearward sliding movement of said rain visor panel.

5. A weather visor structure for the windshield of a motor vehicle secured to the roof top thereof comprising a removably attached rain visor panel, a longitudinally disposed visor support, said removably attached rain visor panel being attachable and longitudinally adjustable upon sliding movement of said rain visor panel on said visor support, said rain visor panel having at least one laterally disposed vertical supporting extension, said vertical supporting extension being substantially narrow in lateral width and extending at a downward angle from the lateral edge of said rain visor panel and provided with a centrally located aperture through said vertical supporting extension, roof engaging means mounted on the roof top and engaging the rear portion of said support in supporting said support therefrom and over the roof top and the windshield area, said visor support freely engaging the said centrally located aperture of said vertical supporting extension of said rain visor panel in adjustably supporting said rain visor panel for removable attachment thereto.

6. A weather visor structure for the windshield of a motor vehicle secured to the roof top thereof comprising a removably attached rain visor panel, longitudinally disposed laterally spaced apart visor supports, said removably attached rain visor panel being attachable and longitudinally adjustable upon sliding movement of said rain visor panel on said visor supports, said rain visor panel having laterally spaced apart and laterally disposed vertical supporting extensions extending at a downward angle from the lateral edge of said rain visor panel and provided with an aperture through each of said vertical supporting extensions, roof engaging means mounted on the roof top and engaging the rear portions of said supports in supporting said supports therefrom and over the roof top and the windshield area, said visor supports freely engaging the said apertures of said laterally spaced apart vertical supporting extensions of said rain visor panel in adjustably supporting said rain visor panel for removable attachment thereto.

References Cited by the Examiner
UNITED STATES PATENTS 3,219,385  11/1965  Francis _____ 296—95

FOREIGN PATENTS 232,036  11/1959  Australia.

BENJAMIN HERSH, *Primary Examiner.*

J. A. PEKAR, *Assistant Examiner.*